United States Patent [19]

Cameron

[11] Patent Number: 5,075,097

[45] Date of Patent: Dec. 24, 1991

[54] METHOD AND APPARATUS FOR SULFURIC ACID CONCENTRATION

[76] Inventor: Gordon M. Cameron, 4 Wellesbourne Cres., Willowdale, Ont., Canada, M2H 1Y7

[21] Appl. No.: 595,516

[22] Filed: Oct. 11, 1990

[51] Int. Cl.$^5$ ............ C01B 17/69; C01B 17/90; C01B 17/48

[52] U.S. Cl. ................ 423/522; 423/531; 423/DIG. 2; 422/161; 159/47.1; 203/12

[58] Field of Search ........... 423/DIG. 1, DIG. 2, 423/522, 528, 531; 422/281, 280, 169, 168, 173; 159/22, 23, 47.1; 202/198; 203/12

[56] References Cited

U.S. PATENT DOCUMENTS

| | | | |
|---|---|---|---|
| 3,294,650 | 12/1966 | Manteufel | 423/531 |
| 3,754,074 | 8/1973 | Grantham | 422/173 |
| 4,200,616 | 4/1980 | Johansen | 422/169 |
| 4,719,088 | 1/1988 | Itoh et al. | 422/169 |
| 4,778,566 | 10/1988 | Vinz | 202/153 |
| 4,910,011 | 3/1990 | Dörr et al. | 423/522 |

Primary Examiner—Gary P. Straub
Assistant Examiner—Timothy C. Vanoy
Attorney, Agent, or Firm—Rogers, Bereskin & Parr

[57] ABSTRACT

Dilute waste sulfuric acid is concentrated by heating it against product acid and then passing it through two contact zones separated by a collection zone. The dilute acid scrubs vapour produced in the collection zone and from a high temperature acid reboiler. In the collection zone acid is drawn off, heated, and recirculated to the collection zone where part of the liquid flashes to vapour. The main heat input is to the more dilute low temperature recirculating acid from the first contact zone rather than to the more concentrated high temperature acid in the reboiler. As a result, less sulfuric acid vapour is generated; the major portion of the heat can be fed to the process at low temperature; and only a single column is required, having a single cool clear water vapour exit stream to dispose of.

16 Claims, 2 Drawing Sheets

METHOD AND APPARATUS FOR SULFURIC ACID CONCENTRATION

FIELD OF THE INVENTION

This invention relates to a method and apparatus for concentrating dilute sulfuric acid. The invention is particularly useful for reconcentrating waste sulfuric acid.

BACKGROUND OF THE INVENTION

Many industrial processes use sulfuric acid to promote reaction. In such use they generate contaminated dilute streams of sulfuric acid which must be reconcentrated, cleaned-up, neutralized or otherwise disposed of. Typical of such processes are organic nitrations where the affinity of sulfuric acid for water allows nitro groups to be placed on both aliphatic and aromatic organic compound. Explosives, dyestuffs, and many fungicide, herbicide and insecticide processes use such techniques. Dilute sulfuric acid is also produced where the acid is used to dry a gas stream such as chlorine or sulfur dioxide.

The dilute sulfuric acid streams which must be disposed of may contain impurities, some of which are reaction by-products. One technique for removal of the impurities is to raise the temperature of the acid to between 250° and 330° C. and to hold the acid at this temperature until the impurity has been digested by the hot acid. Very hot sulfuric acid is a powerful oxidant, provided that its temperature is high enough.

Various approaches have been used in the past to reconcentrate dilute sulfuric acid, but the costs have been high and problems have existed. One common approach is the use of pot concentrators, where contaminated acid is passed through a scrubbing column into a cast iron pot which is heated by products of combustion to evaporate vapour which then passes out through the scrubbing column to atmosphere. This approach operates at atmospheric pressure. The process offers very long residence time of the hot acid in the pot but has a very limited ability to evaporate water since the amount of heat that can be transferred to the acid is limited by the exposed surface for heat transfer, the very limited external heat transfer coefficient associated with atmospheric pressure hot gas, and the thermal resistance of the wall of the cast iron pot. A further disadvantage is that failures of the cast iron pot have not uncommonly led to large quantities of very hot acid being dumped into the furnace and environment, causing extensive and visible pollution.

A second approach which has been used in the past is to blow combustion gases at atmospheric pressure into the waste acid. While this approach is effective in injecting heat into the acid, it has been found to generate an off-gas containing a very persistent and noxious chemical fume which is difficult to remove. This approach has therefore fallen into disfavour.

A third and more common approach is the use of heat transfer surfaces in tantalum or glass (e.g. glass-lined vessels). In this case high pressure steam is commonly used as the energy source. However with the use of tantalum, there are severe limits on the temperatures that can be used in the evaporation. These limits are set by the corrosion of tantalum which must be kept low to avoid the nascent hydrogen corrosion product from accumulating in the tantalum and causing hydrogen embrittlement and equipment failure. Typical maximum acid temperatures of 190° C. therefore exist when tantalum is used. Glass lined steel usually has a safe upper temperature operating limit of about 230° C.

When the 190° C. temperature is combined with vapour pressure tables for sulfuric acid solutions, it is found that the vapour pressures that can be accepted over acid above 90% strength are in the order of 10 mmHg. Such pressures cannot be obtained in a barometric condenser, so it has been found necessary in such cases to use steam jet ejectors to raise the pressures to the level at which the vapors can be condensed against cooling water. Steam jet ejectors are normally not preferred because such ejectors can use between one and five pounds of high pressure steam for every pound of vapour condensed. The density of water vapour at pressures of 10 mmHg is also very low, and even using the largest glass lined equipment, the capacity of a single vessel as an evaporator is very limited, so frequently multiple units are required.

A further limitation of the above approach is that there is a significant content of sulfuric acid in the vapour over acid of about 80% strength, and simple removal of vapour can then transfer such acid into effluent and condensate systems where it is undesirable. In some designs this problem and the very low vapour pressure have been accommodated by condensing the vapors from the last and strongest effect in cold feed acid which has a much lower vapour pressure than water. This last approach eliminates the need for steam jet ejectors and the worry about sulfuric acid vapors contaminating the condensates. However it brings a new inefficiency to the process since the water vapour from the last effect now needs to be evaporated twice.

A still further limitation to the above process lies in the frequent need to raise the acid to temperatures above 250° C. to destroy organic by-products present in the acid. Such temperatures are impossible to achieve with tantalum heat transfer surfaces.

Other vacuum approaches exist using acid resistant brick, lead and glass equipment but suffer similar constraints to those of the cast iron pot with respect to capacity, and they are expensive because of the need to use large vessels resistant to hot concentrated acid.

OBJECT OF THE INVENTION

It is an object of this invention to provide a method and apparatus for concentrating dilute sulfuric acid, in which a major portion of the energy required is supplied at a lower temperature than has previously been used, and yet in which only one effluent vapour stream (which has been scrubbed) need be produced, and which moreover can provide a very large capacity in a single unit.

SUMMARY OF THE INVENTION

In its broadest aspect the invention provides a process for concentrating dilute sulfuric acid comprising:

(a) flowing said dilute acid through a first contact zone and there contacting it with a first vapour stream flowing countercurrent to said dilute acid, said first vapour stream containing water and sulfuric acid vapours, as a result of which said first vapour stream is scrubbed of sulfuric acid and is cooled and said dilute acid is enriched in acidity, (b) flowing such enriched acid from said first contact zone into a collection zone, (c) collecting and drawing off acid from said collection zone, heating such collected acid, returning such heated collected acid back into said collection zone and flashing off vapour from such returning acid, thus to concentrate said acid in said collection zone, (d) withdrawing and flowing a portion of the concentrated acid from said collection zone through a second contact zone and there contacting it with a second vapour stream flowing countercurrent to said concentrated acid, said second vapour stream containing water and sulfuric acid vapours, as a result of which said second vapour stream is partially scrubbed of acid and is cooled and said concentrated acid is further enriched in acidity to form further concentrated acid, (e) concentrating said further concentrated acid by heating the same at high temperature to form product acid and a vapour stream containing water and sulfuric acid vapours, (f) flowing said vapour stream from said step (e) through said second contact zone as said second vapour stream, (g) flowing vapour leaving said second contact zone through said first contact zone as at least a portion of said first vapour stream, (h) drawing off water vapour which leaves said first contact zone.

Further objects and advantages of the invention will appear from the following description, taken together with the accompanying drawings

DETAILED DESCRIPTION OF PREFERRED EMBODIMENT

Figure 1:
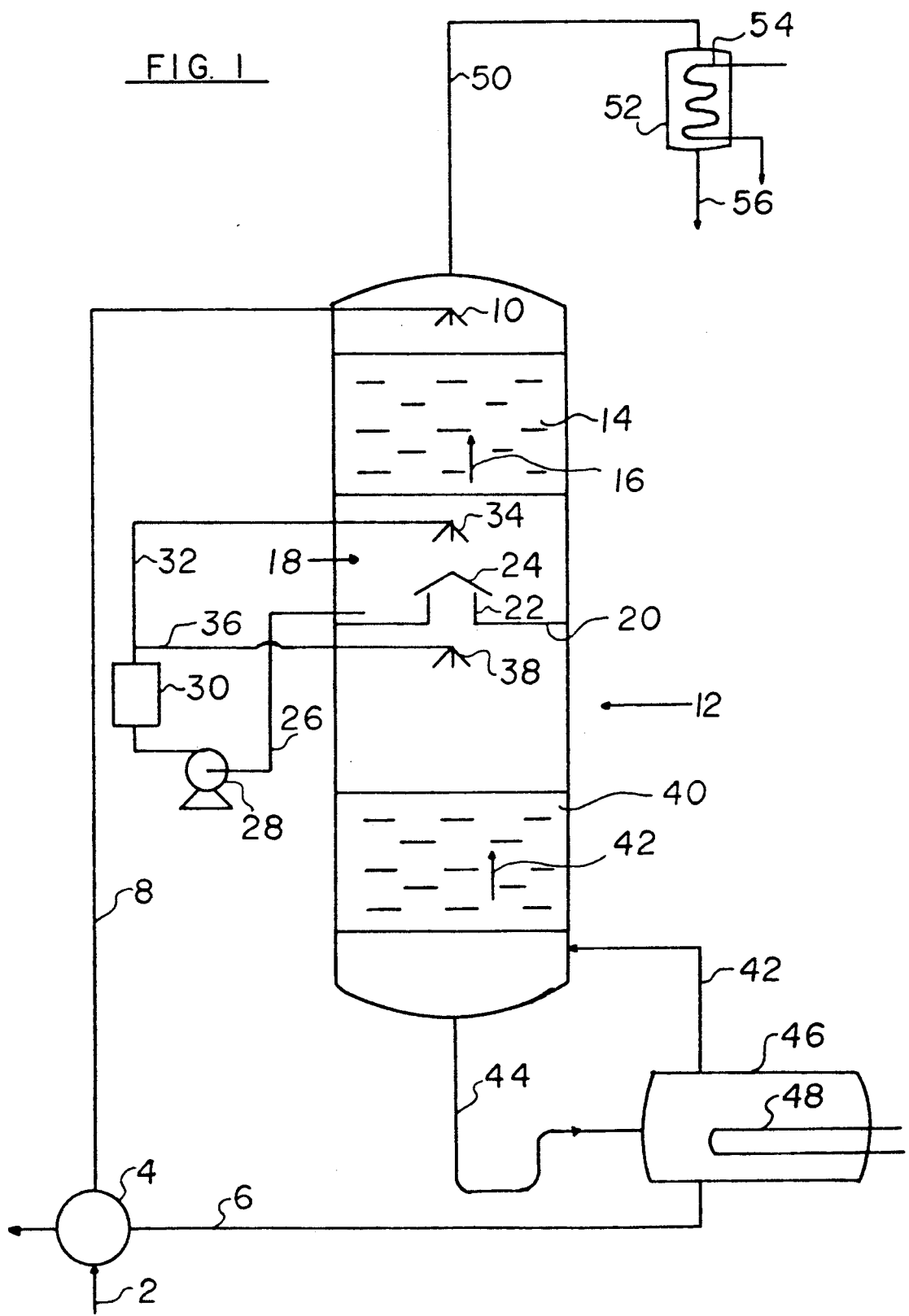
FIG. 1 is a diagrammatic view of apparatus according to the invention.

Reference is made to FIG. 1, which shows an input dilute waste acid stream 2. Stream 2 is typically 70% sulfuric acid (although it may also be 60% or less). Stream 2 is pumped through a product acid cooler 4 where it is heated by heat exchange with a stream 6 of hot product acid (which will be described shortly). The cooled product acid stream is then directed to storage.

The heated dilute feed acid, now shown as stream 8, is directed to a spray nozzle 10 at the top of a tower or column generally indicated at 12. The stream 8 is then sprayed through nozzle 10 and falls to a conventional upper packing mass 14, less any water which has flashed off as a result of super heat supplied by heat exchange from the product acid stream 6. Since the concentration of stream 8 is relatively low, essentially no sulfuric acid vapors will flash off at nozzle 10.

The upper packing mass 14 contains conventional packing materials such as ceramic or glass balls, rings or other shapes. As it falls through the upper packing mass 14, the feed stream of dilute acid contacts a rising stream of vapour indicated by arrow 16. The source of vapour 16 will be described shortly, but vapour 16 comprises water vapour with some sulfuric acid vapour. As a result of the contact between the feed stream and the vapour 16, sulfuric acid is scrubbed from the vapour 16 with a simultaneous evaporation of water from the acid; the vapour stream 16 is cooled, and the falling acid stream is thereby enriched in acid.

Typically, if the feed stream 8 is 70% sulfuric acid, it is enriched to about 71% sulfuric acid by flashing at the nozzle 10, and is further enriched to about 73% to 74% after passing through the upper packing mass 14.

The liquid stream from the upper packing mass 14 next falls to a collection zone 18. Collection zone 18 is shown diagrammatically as having a baffle 20 extending across the column, a chimney 22 extending upwardly at the center of the baffle 20, and a "rain hat" 24 covering the chimney (to prevent liquid from entering the chimney 22). At collection zone 18 the acid stream from packing mass 14 is mixed with a recirculating stream of acid produced as follows.

From the acid collected on baffle 20 a stream of acid 26 is drawn off through recirculating pump 28 and is pumped through a heater 30 (whose heat source can be steam, hot oil, electrical or a heat transfer fluid). Typically the stream 26 is heated to between 150° C. and 250° C. and is then directed as stream 32 to a flash nozzle 34 at the top of the collection zone 18. At flash nozzle 34 the stream 32 is sprayed down into the collection zone 18 and mixes with the feed stream falling from the upper packing mass 14.

The nozzle 34 is termed a flash nozzle simply because, due to the pressure drop across it and because the temperature and concentration in stream 32 correspond to those of superheated liquid at the pressure inside the column, therefore as soon as the liquid leaves nozzle 34 and enters the collection zone 18, vapour flashes off the liquid. The vapour flashed off is primarily water vapour, but may be mixed with some sulfuric acid vapour, the quantity of acid vapour depending on the acid strength. The vapour flashed off at nozzle 34 rises and forms part of the vapour stream 16.

Typically, because of the concentration achieved by evaporation of water and the recirculation at the collection zone 18, stream 26 may typically be 87% sulfuric acid and the liquid leaving spray nozzle 34 may be 88% sulfuric acid (since it gains 1% concentration due to the flashing).

From the circulating liquid stream 32, an overflow or excess is drawn off as stream 36 and fed to spray nozzle 38. From nozzle 38 the acid is sprayed onto a conventional lower packing mass 40. In packing mass 40 the falling liquid stream contacts an upwardly rising vapour stream 42 containing both water and sulfuric acid vapours. As a result of this contact the rising vapour stream 42 is cooled and the bulk of any acid present in vapour 42 is transferred to the falling liquid stream with simultaneous evaporation of water from the liquid stream, which is thus enriched, typically to 89% to 90% acid.

The liquid from the bottom of the tower or column 12 then flows by gravity, as stream 44, to a reboiler unit 46. The reboiler unit 46 may be a glass-lined or brick-lined steel vessel. Here the liquid is heated to produce the vapour stream 42. The temperature of reboiler 46 is such that there is sufficient vapour pressure to cause the vapour stream 42 to flow upwardly to the top of the column and then through a condenser if required. The concentration of the acid in the reboiler 46 is the product acid concentration, and the temperature is then set by the pressure level chosen for the tower and the product acid concentration Typically the concentration of the product acid stream 6 will be 93% to 96%. The temperature of the boiling acid in reboiler 46 may be in the range 200° C. to 330° C. Heat input for the reboiler 46 can be supplied by a bayonet or tube bundle element 48 (of materials which will be discussed later) or by other means such as induction or microwave heating.

The water vapour leaving the top of the column 12 as stream 50 may be vented to atmosphere, or it may as shown be condensed in condenser 52 using a cooling coil 54 supplied with ordinary cool water. The condensate stream 56 will have very little sulfuric acid vapour therein by comparison with conventional multi-stage concentrators. It may contain at worst some of the volatile organic impurities found in the feed acid.

The process and apparatus described have a number of advantages. Firstly, with the interchange between the feed and product acid streams, it is possible to cool the product acid stream down almost to the temperature of the feed stream while recovering this heat into the process. For a case in which the feed is 60% sulfuric acid and the product is 96% sulfuric acid, the temperature difference can be 150° C. when the process operates at 66 mmHg. Similarly, the water vapour which leaves the process as stream 50 is at a low temperature set by the dilute input feed acid and not by the concentrated acid product, resulting in a higher energy efficiency.

In addition, the process is simple since it is possible to operate with only one vapour stream. If it is desired to condense such vapour stream, only one condenser is needed without the need for extra booster jet ejectors or multiple separate stages to regulate.

Because of the high degree of scrubbing of the vapours leaving the reboiler 46, since these vapours pass through two packing sections, little acidity as mentioned will be found in the effluent vapour stream 50 as compared with conventional multi-stage concentrators. In addition, since the quantity of vapour generated in the reboiler 46 is much lower than in conventional processes, therefore there is much less acid to scrub out.

The operating pressure range used can also be broader than in conventional processes, since the previous limitations set by tantalum and glass-lined steel are no longer binding. For example the reboiler 46 can be a brick-lined vessel. The heat input requirement for the reboiler 46 will usually be less than about 50% of the total heat input to the system described and typically may be only 15% of the total heat input; the remainder is supplied at the heater 30. Since the heat input needed in the reboiler 46 is usually only a small fraction of the total heat input to the process, the designer has much more design freedom. Therefore more expensive heat transfer surface and materials and forms of energy are affordable and can be used. For example, quartz, silica or silicon carbide or Duriron (trade mark) can be used for heat transfer surfaces (for heating elements). Alternatively electrical energy can be used as a heat source, e.g. by resistance heating using a heating element, or by direct flow of AC current through the acid using graphite contacts, or by microwave or induction heating.

The avoidance of the present limitations on pressure and temperature set by tantalum (the present art) allow pressures to be raised to levels which are consistent with condensation of the water vapour effluent stream against cooling water without the need for steam ejectors or refrigeration of the cooling water/condenser.

In addition the higher system operating pressure allows smaller and less costly equipment to be used and commonly eliminates the need and cost of multiple train designs. If desired, the process can be operated at atmospheric pressure to allow high acid temperatures to be obtained to destroy difficult organic contaminants.

Various modifications can be made in the apparatus and method described. For example the overflow stream 36 can be from the pump 28 without passing through the heater 30, or it can be by overflow from the liquid collector 18.

In addition, multiple low level heat inputs may be used. For example there can be additional packing sections, collection zones, and additional recirculating acid streams such as stream 32.

Figure 2:
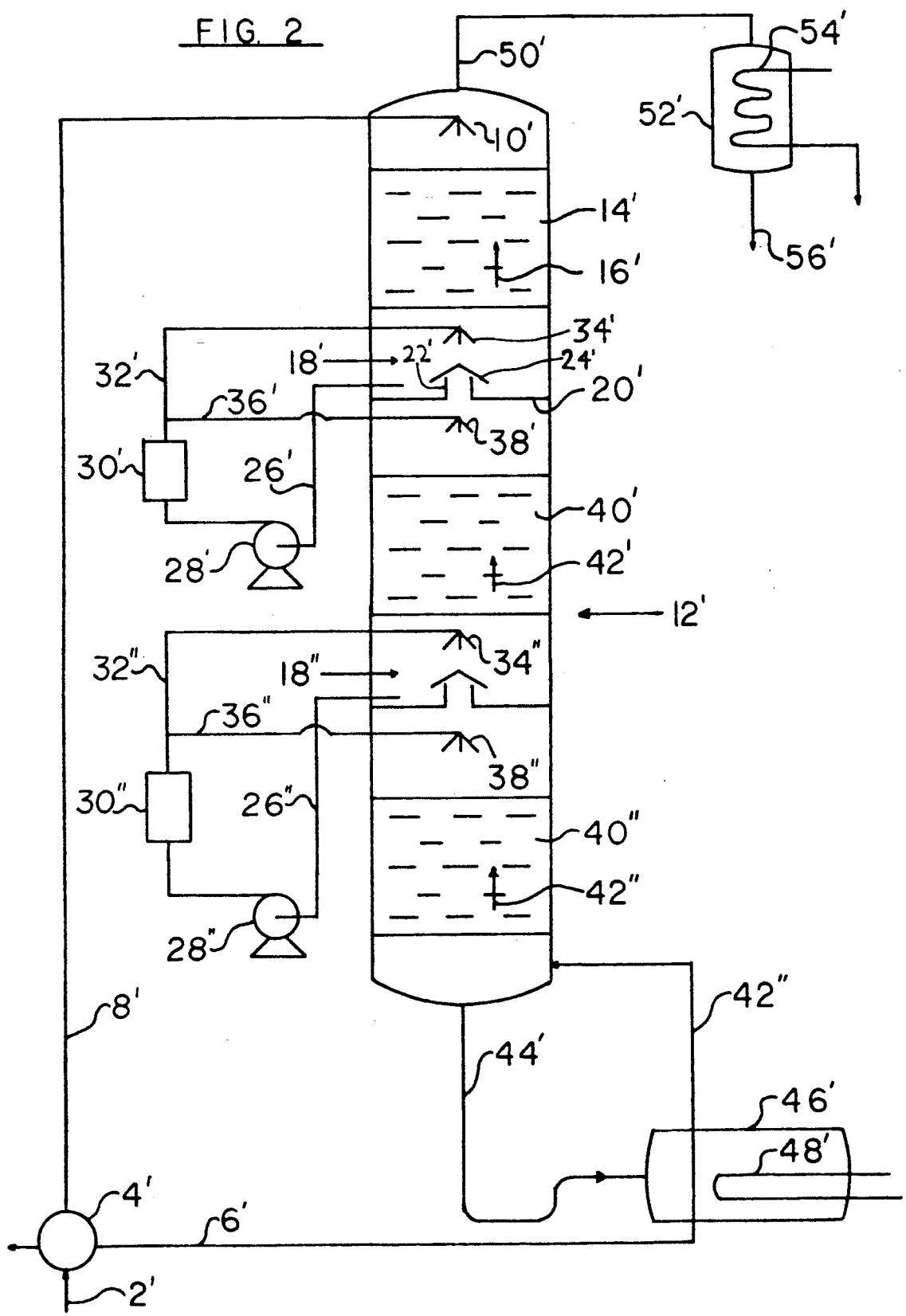
FIG. 2 shows a modification of the FIG. 1 apparatus.

An example of this is illustrated in FIG. 2, which shows apparatus similar to that of FIG. 1 and in which primed reference numerals indicate parts corresponding to those of FIG. 1. The FIG. 2 apparatus differs from the FIG. 1 apparatus in that an extra collection zone 18" has been added. Collection zone 18" is the same as collection zone 18' and is denoted by double primed reference numerals. In addition a third packing or contact zone 40" has been added, also denoted by double primed reference numerals. Parts with double primed reference numerals in FIG. 2 indicate parts corresponding to those of FIG. 1, but such parts with double primed reference numerals are associated with the extra collection zone 18" and the third contact zone 40". The apparatus shown in FIG. 2 permits additional scrubbing of the effluent vapours.

As a further modification, more than one feed point on the column 12 can be used if desired. For example feed acid can be directed onto packing zones 14', 40'. In addition multiple systems such as those shown in FIGS. 1 and 2 can be used.

I claim:

1. A process for concentrating dilute sulfuric acid comprising:
   (a) flowing said dilute acid through a first contact zone and there contacting it with a first vapour stream flowing countercurrent to said dilute acid, said first vapour stream containing water and sulfuric acid vapours, as a result of which said first vapour stream is scrubbed of sulfuric acid and is cooled and said dilute acid is enriched in acidity,
   (b) flowing such enriched acid from said first contact zone into a collection zone,
   (c) collecting and drawing off acid from said collection zone, heating such collected acid to a first temperature, returning such heated collected acid back into said collection zone and flashing off water vapour from such returning acid, thus to concentrate said acid in said collection zone,
   (d) withdrawing and flowing a portion of the concentrated acid from said collection zone through a second contact zone and there contacting it with a second vapour stream flowing countercurrent to said concentrated acid, said second vapour stream containing water and sulfuric acid vapours, as a result of which said second vapour stream is partially scrubbed of acid and is cooled and said concentrated acid is further enriched in acidity to form further concentrated acid,
   (e) concentrating said further concentrated acid by heating the same to a second temperature higher than said first temperature to form product acid and a vapour stream containing water and sulfuric acid vapours,
   (f) flowing said vapour stream from said step (e) through said second contact zone as said second vapour stream,
   (g) flowing vapour leaving said second contact zone through said first contact zone as at least a portion of said first vapour stream, (h) drawing off water vapour which leaves said first contact zone, (i) the heating energy input in said step (e) being less than about 50% of the total heating energy input supplied in said steps (c) and (e).

2. A process according to claim 1 and including flowing vapour flashed from said returning acid, through said first contact zone as a part of said first vapour stream.

3. A process according to claim 2 wherein said step (e) is performed by collecting said further concentrated acid and then boiling such collected acid.

4. A process according to claim 3 and including the step of heating said dilute acid, by heat exchange with said product acid, before said dilute acid enters said first contact zone.

5. A process according to claim 4 and including the step of condensing said water vapour drawn from said first contact zone.

6. A process according to claim 4 wherein said portion of said acid withdrawn from said collection zone for flowing into said second contact zone is withdrawn immediately after being heated.

7. A process according to claim 2 wherein said dilute sulfuric acid is waste sulfuric acid.

8. A process according to claim 2 wherein in said step (c) said acid is heated to a temperature in the range 150° C. to 250° C.

9. A process according to claim 8 wherein in said step (e) said acid is heated to a temperature in the range 200° C. to 330° C.

10. A process according to claim 10 wherein the heating energy input in said step (e) is between about 15% and 50% of the total heating energy input supplied in said steps (c) and (e).

11. A process for concentrating dilute sulfuric acid comprising:

(a) heating said dilute acid, (b) feeding said dilute acid to the top of a concentration tower and causing it to fall by gravity through a first contact zone where it countercurrently contacts a rising stream of water vapour and sulfuric acid vapour to be cleaned, as a result of which said dilute acid is enriched in acidity to form a first enriched acid stream and said vapour is scrubbed of acidity and is cooled, (c) causing said first enriched acid stream to fall to the bottom of a collection zone, (d) drawing off acid from said collection zone, heating such drawn off acid, returning such heated drawn off acid into the top of said collection zone to mix with said first enriched acid stream to form a further enriched acid, and also flashing off vapour from such returning heated acid, (e) drawing off a portion of said further enriched acid as a second acid stream, and causing said second acid stream to fall by gravity through a second contact zone where it countercurrently contacts a second stream of water vapour and sulfuric acid vapour to be cleaned, as a result of which said second acid stream is enriched in acidity to become a third enriched acid stream and said second vapour stream is reduced in acidity and is cooled, (f) directing said third enriched acid stream to a boiler and there heating said third enriched acid stream to produce product acid and said second vapour stream, (g) directing said second vapour stream into said second contact zone and then directing vapours from said second zone and from said collection zone into said first contact zone, (h) drawing off water vapour from said first contact zone, and (i) performing said step (a) by heating said dilute acid by heat exchange with said product acid.

12. A process according to claim 11 wherein said second vapour stream after leaving said second contact zone passes through said collection zone and mixes with said vapour from acid flashed into said collection zone, said second vapour stream and such vapour together comprising said first vapour stream.

13. A process according to claim 12 wherein said water vapour drawn from said first contact zone is condensed.

14. A process according to claim 11 wherein said dilute sulfuric acid is waste sulfuric acid containing impurities.

15. A process according to claim 11 wherein the heating energy input to said boiler is less than the heating energy input to acid returned to said collection 16. A process according to claim 11 wherein the heating energy input to said boiler is between about 15% and 50% of the total heating energy input to said boiler and to said acid returned to said collection zone.

* * * * *